United States Patent
Niininen et al.

(10) Patent No.: US 11,163,554 B2
(45) Date of Patent: Nov. 2, 2021

(54) METHOD AND APPARATUS FOR IDENTIFYING ABANDONED APPLICATIONS AND SERVICES

(71) Applicant: HERE GLOBAL B.V., Eindhoven (NL)

(72) Inventors: Mauri Niininen, Lexington, MA (US); Ali Abbas, Hanau (DE)

(73) Assignee: HERE Global B.V., Eindhoven (NL)

( * ) Notice: Subject to any disclaimer, the term of this patent is extended or adjusted under 35 U.S.C. 154(b) by 11 days.

(21) Appl. No.: 16/155,629

(22) Filed: Oct. 9, 2018

(65) Prior Publication Data
US 2020/0110596 A1    Apr. 9, 2020

(51) Int. Cl.
G06F 9/44    (2018.01)
G06F 8/70    (2018.01)
G06N 20/00   (2019.01)

(52) U.S. Cl.
CPC ............... G06F 8/70 (2013.01); G06N 20/00 (2019.01)

(58) Field of Classification Search
None
See application file for complete search history.

(56) References Cited

U.S. PATENT DOCUMENTS

| | | | |
|---|---|---|---|
| 7,552,078 B2 | 6/2009 | Flaxer et al. | |
| 7,689,529 B2 | 3/2010 | Fung et al. | |
| 8,027,903 B2 | 9/2011 | Bishop et al. | |
| 9,092,291 B1* | 7/2015 | Adib | G06F 9/451 |
| 2007/0078702 A1* | 4/2007 | Tandon | G06Q 10/06375 705/7.37 |
| 2015/0286820 A1* | 10/2015 | Sridhara | G06F 21/566 726/23 |
| 2016/0267600 A1 | 9/2016 | Nagaraja et al. | |
| 2017/0155595 A1* | 6/2017 | Chefalas | G06F 9/45558 |
| 2018/0018465 A1* | 1/2018 | Carey | G06F 21/55 |

OTHER PUBLICATIONS

Capgemini, "Why CIOs Should Consider Artificial Intelligence to Manage Their IT Portfolio", Publish date: Dec. 13, 2017, retrieved from https://www.capgemini.com/2017/12/why-cios-should-consider-artificial-intelligence-to-manage-their-it-portfolio/, pp. 1-5.

* cited by examiner

*Primary Examiner* — Qamrun Nahar
(74) *Attorney, Agent, or Firm* — Ditthavong, Steiner & Mlotkowski

(57) ABSTRACT

An approach is provided for automatically identifying abandoned applications and services. The approach includes determining application management data related to the application. The application management data includes characteristics indicating a lifecycle of the application within a computing infrastructure. The approach also includes extracting one or more features from the application management data. The approach further includes processing the one or more features using a trained machine learning model to classify the abandonment status of the application, wherein the abandonment status includes an abandoned state and a non-abandoned state.

20 Claims, 9 Drawing Sheets

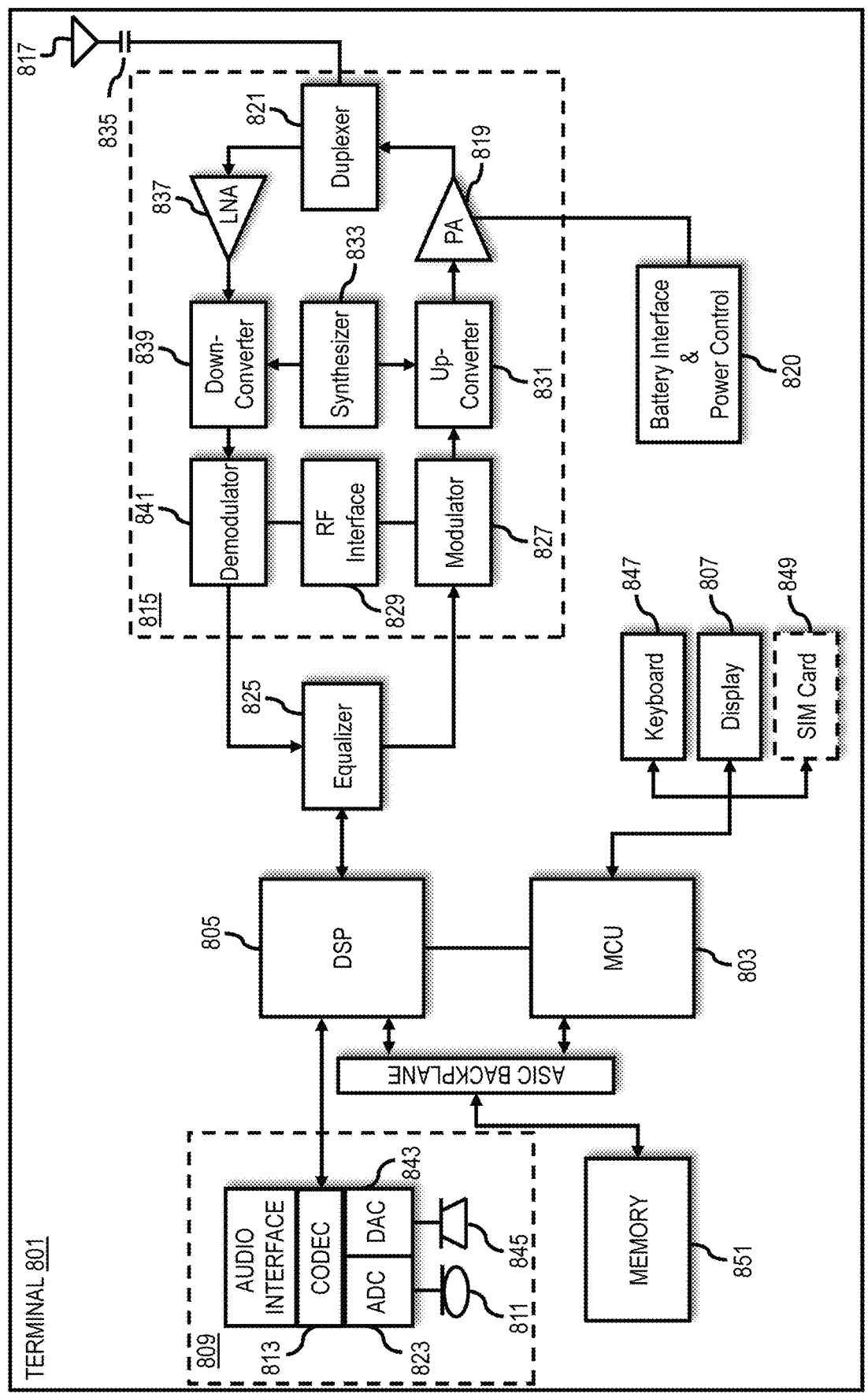

METHOD AND APPARATUS FOR IDENTIFYING ABANDONED APPLICATIONS AND SERVICES

BACKGROUND

Many companies maintain large portfolios of information technology (IT) services, applications, infrastructure, etc. to support their operations. For example, it is not uncommon for companies to have hundreds or thousands of different IT services, applications, etc. deployed throughout their organizations. The high volume of services/applications makes tracking their deployment status a significant technical challenge especially in light of how quickly new services/applications are developed and replaced. The need for up-to-date tracking is particularly acute when services or applications are "abandoned" (i.e., applications that are no longer supported or commissioned within an organization even though they may remain, such as in common use). These abandoned applications can cost the companies millions of dollars to maintain unnecessarily and can increase security vulnerability risks. SOME EXAMPLE EMBODIMENTS Therefore, there is a need for an approach for automatically identifying abandoned applications by leveraging advances in automated machine learning processes.

According to one embodiment, a method for identifying an abandonment status of an application comprises determining application management data related to the application. The application management data includes characteristics indicating a lifecycle of the application within a computing infrastructure. The method also comprises extracting one or more features from the application management data. The method further comprises processing the one or more features using a trained machine learning model to classify the abandonment status of the application, wherein the abandonment status includes an abandoned state and a non-abandoned state.

According to another embodiment, an apparatus for identifying an abandonment status of an application comprises at least one processor, and at least one memory including computer program code for one or more computer programs, the at least one memory and the computer program code configured to, with the at least one processor, cause, at least in part, the apparatus to process ground truth application data related to a ground truth application to extract one or more training features. The ground truth application management data includes characteristics indicating a lifecycle of the ground truth application within a computing infrastructure. The apparatus is also caused to train a machine learning model using the one or more training features, the ground truth application data, or a combination thereof. The trained machine learning model is used to classify an abandonment status of the application based on one or more features of application management data associated with the application. The abandonment status includes an abandoned state and a non-abandoned state According to another embodiment, a non-transitory computer-readable storage medium for identifying an abandonment status of an application carries one or more sequences of one or more instructions which, when executed by one or more processors, cause, at least in part, an apparatus to determine application management data related to the application. The application management data includes characteristics indicating a lifecycle of the application within a computing infrastructure. The apparatus is also caused to extract one or more features from the application management data. The apparatus is further caused to process the one or more features using a trained machine learning model to classify the abandonment status of the application, wherein the abandonment status includes an abandoned state and a non-abandoned state.

According to another embodiment, an apparatus for identifying an abandonment status of an application comprises means for determining application management data related to the application. The application management data includes characteristics indicating a lifecycle of the application within a computing infrastructure. The apparatus also comprises means for extracting one or more features from the application management data. The apparatus further comprises means for processing the one or more features using a trained machine learning model to classify the abandonment status of the application, wherein the abandonment status includes an abandoned state and a non-abandoned state.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a diagram of a terminal that can be used to implement an embodiment.

DESCRIPTION OF SOME EMBODIMENTS

Examples of a method, apparatus, and computer program for identifying abandoned applications and services, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
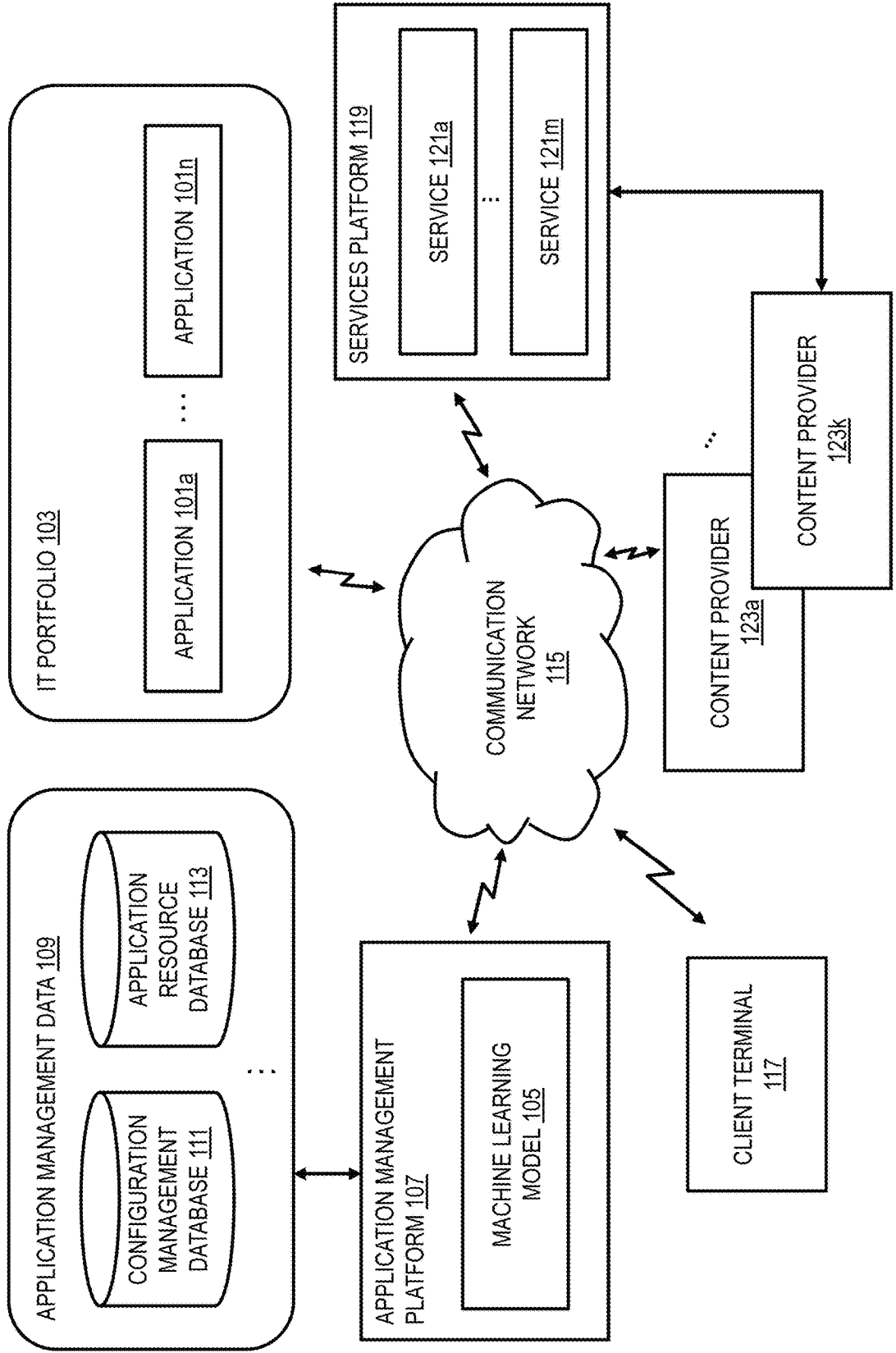
FIG. 1 is a diagram of a system capable of automatically identifying abandoned applications and services, according to one embodiment.

FIG. 1 is a diagram of a system capable of automatically identifying abandoned applications and services, according to one embodiment. As briefly described above, companies that operate large information technology (IT) service (or application) portfolios typically face significant challenges in tracking services, applications, etc. over their typical lifecycle stages from "Pre-Launch" (e.g., planning underway to deploy or install the services/applications such as beta testing with a limited group before full deployment), "Live" (e.g., services/applications that have been deployed and are in use for production), "Ramp Down" (e.g., services/applications that have been marked for decommissioning and are in transition to other equivalent services/applications or shutdown), and "Decommissioned" (e.g., services/applications that have completed the ramp down stage and are no longer supported or used. To track services/applications (e.g., according to their respective lifecycle stages), companies have traditionally relied on performing manual portfolio review and assessment. Historically, companies have invested considerable human and computer resources (e.g., IT asset management databases) to manually track services/applications to determine when they go abandoned. However, due to the large amount of data involved, these traditional assessments often require expensive manual analysis and subject matter expertise in classifying the applications correctly and the burden can be significant and difficult to scale when resources are limited. In typical organizations where there is routine staff turnover, the people who were originally responsible for a particular service/application might have left the company. Therefore, the subject matter experts may no longer be available to answer questions to facilitate management and tracking of the service/application.

As a result, these companies often operate many applications that have been "abandoned" by respective product teams or business units. As used herein, the term "abandoned" refers to any service/application that is no longer supported or actively managed by a company or organization. It is noted that lack of support (i.e., abandonment) of a service/application does not necessarily mean that the service or application is no longer used within a company. In fact, because of the lack of support (e.g., continual update, maintenance, improvements, fixes, etc.) of the services or applications, continued users of the abandoned service/application can cost the company money (e.g., by using obsolete or old software, consuming IT resources, etc.) and increase security risks (e.g., because abandoned applications are typically no longer updated to patch against the latest security vulnerabilities, data security may be overlooked, etc.). In one embodiment, the term "abandoned" (also referred to as "AbandonWare") refers broadly to conditions in which a company or subunit of the company (e.g., a product team or business unit) acts in a way to indicate a lack of support or active management (e.g., overseeing the deployment) of the service or application. For example, the act can be explicit such as when the company officially decommissions or announces that a service/application is no longer supported. In addition, the act the can implicit such as in the following but not exclusive example scenarios:

Service/application owners/product managers/research & development (R&D) leads have left the organization;

No one in the organization is willing to take ownership and accountability for the service/application and related costs;

The responsible R&D team has been reassigned to new products or is no longer available to maintain the service/application;

Service/application is not actively maintained, security vulnerabilities are not fixed, outdated software/operating systems (OS) versions are not updated; and Possible onboarding project that was initiated was never completed, and service/application was left in "Pre-Launch" state for an extended time period.

As noted above, having this kind of "AbandonWare" can cost a company millions of dollars and can increase security vulnerability risks. For example, an organization may not know which applications have been properly maintained. This is further enhanced by the fact that it becomes gradually difficult and tedious for operators to correctly identify "abandoned" applications due to organizational changes, product roadmap adjustments, and short to long-term strategy changes. By way of example, when people leave the company, companies get reorganized, teams shift around, etc., the chain of knowledge with respect to an application within the company often gets broken. Moreover, as the data collected in the system increases, it becomes more difficult for operators to accurately determine with a high degree of confidence whether an application should be kept in maintenance or decommissioned. Therefore, companies face significant technical challenges to identify abandoned applications.

To address this problem, the system 100 introduces a capability to automatically identify when a company or organization abandons any of the applications 101a-101n (also collectively referred to as applications 101) of its IT portfolio 103 by using a machine learning classifier or model 105 (e.g., a support vector machine (SVM), neural network, decision tree, etc.) of the application management platform 107 to process relevant application management features or signals of the applications 101. In one embodiment, the application management features or signals (e.g., comprising application management data 109) can be extracted from any data source available to the system 100 including, but not limited, to a configuration management database (CMDB) 111, an application resources database 113, and/or any other data source, tool, or system used to keep track of the IT portfolio 103.

For example, the CMDB 111 and/or other data sources for the application management data 109 can be a repository that acts a data warehouse for IT installations and deployments. The CMDB 111 holds data that reference a collection of IT assets (e.g., applications, services, etc., which are commonly referred to as configuration items (CI)), as well as the descriptive relationships between assets. The CMDB 111 often contains company metadata about the installed services/applications. Examples of the metadata include but are not limited to cost centers, contact persons, service/application ownership in the business unit, or product line of the company. Similarly, the application resources database 113 can hold information on what computing resources (e.g., servers, cloud services such as Amazon Web Services (AWS) resources, etc.) are being used including but not limited to creation data, up time, etc.

In one embodiment, the system 100 uses the machine learning model 105 which learns or is trained to identify relevant correlations between the vast amount of information of the application management data 109 mentioned above (e.g., referenced in the CMDB 111). The system 100 can then use the correlation weights of the trained machined learning 105 to predict which applications 101 might be abandoned based on their corresponding feature values indicated in the application management data 109. The system 100, for instance, scans through the application management data 109 (e.g., through the CMDB 111) at a specified deployment interval. The system 100 then uses the trained machine learning model 105 on previously extracted application management data to correctly tag applications which fit the criteria for being abandoned.

For example, when a product line or a business group abandons an application 101 in the IT portfolio 103 for whatever reason, the system 100 can retrieve the relevant signals (e.g., any of the data fields, metadata, etc. of the application management data 109) over a communication network 115, and then use the trained machine learning model 105 to automatically detect and classify the application 101 as abandoned. In this way, the system 100 can advantageously leverage the application management data already maintained in the CMDB 111 to automatically tag abandoned applications 101 for decommissioning, service review, and/or any other off-boarding process. In other words, in one embodiment, the system 100 can predict which unlabeled applications 101 might be abandoned.

Figure 2:
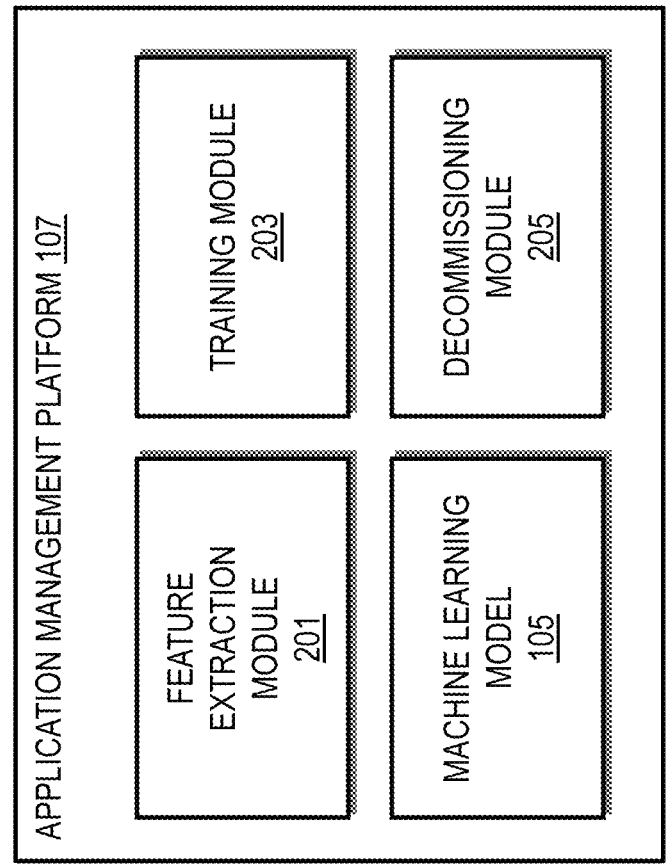
FIG. 2 is a diagram of components of an application management platform, according to one embodiment.

In one embodiment, within the system 100, the application management platform 107 performs the functions related to identifying or classifying abandoned applications 101. As shown in FIG. 2, the application management platform 107 includes one or more components for identifying abandoned applications according to various embodiments described herein. It is contemplated that the functions of these components may be combined or performed by other components of equivalent functionality. In this embodiment, the application management platform 107 includes a feature extraction module 201, a training module 203, the machine learning model 105, and a decommissioning module 205. The above presented modules and components of the application management platform 107 can be implemented in hardware, firmware, software, or a combination thereof. Though depicted as a separate entity in FIG. 1, it is contemplated that the application platform 107 may be implemented as a module of any of the components of the system 100 (e.g., a client terminal 117, services platform 119, any of the services 121a-121m of the service platform 119, etc.). In another embodiment, one or more of the modules 201-205 may be implemented as a cloud-based service, local service, native application, or combination thereof. The functions of the machine learning module 105, the application management platform 107, and modules 201-205 are discussed with respect to FIGS. 3 and 4 below.

Figure 3:
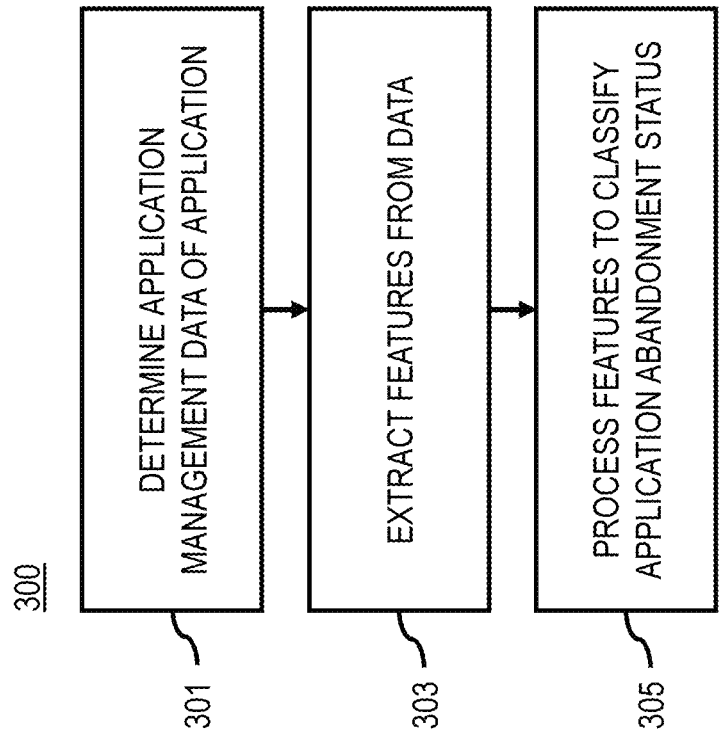
FIG. 3 is a flowchart of a process for identifying abandoned applications, according to one embodiment.
Figure 7:
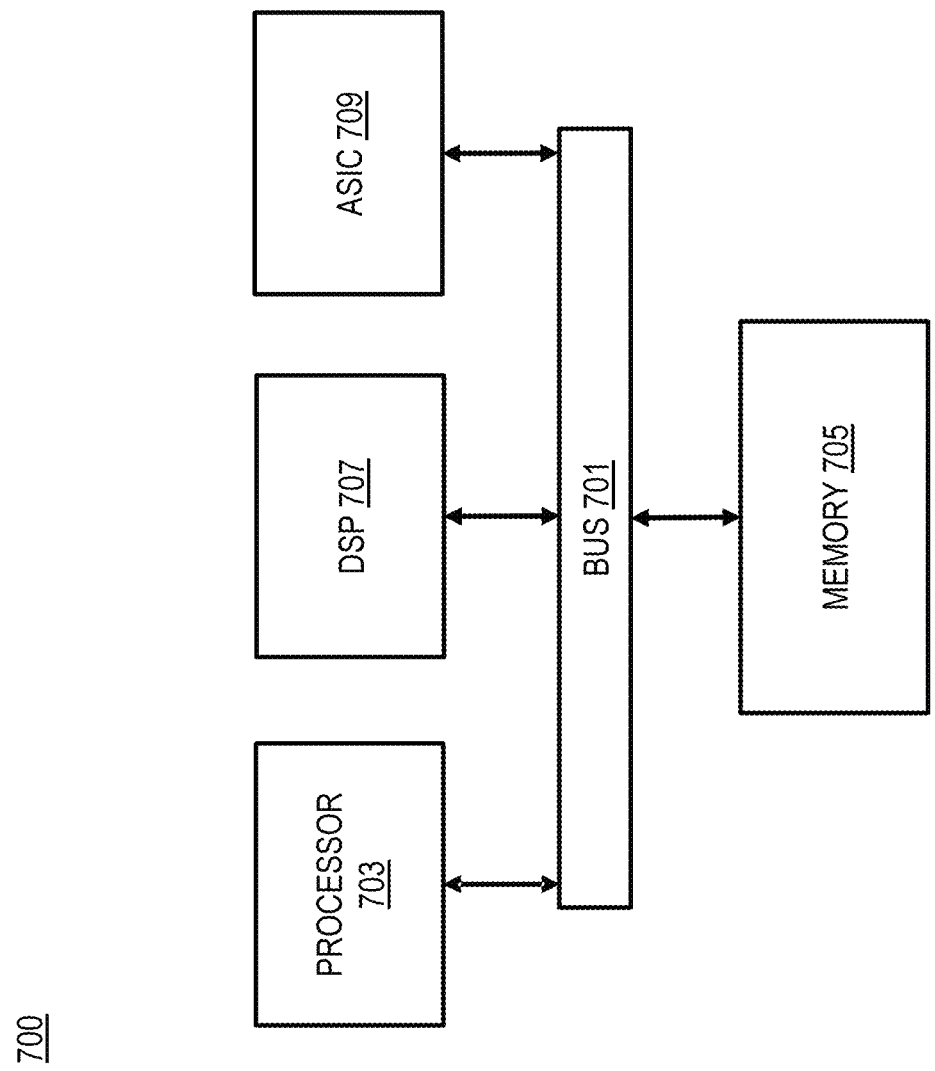
FIG. 7 is a diagram of a chip set that can be used to implement an embodiment.

FIG. 3 is a flowchart of a process for identifying abandoned applications, according to one embodiment. In one embodiment, the process 300 provides for using a trained machine learning model 105 to classify whether an application 101 of interest is abandoned or not based on the application's features or characteristics extracted from its application management data. In various embodiments, the application platform 107, machine learning model 105, and/or any of the modules 201-205 may perform one or more portions of the process 300 and may be implemented in, for instance, a chip set including a processor and a memory as shown in FIG. 7. As such, the application platform 107, machine learning model 105, and/or any of the modules 201-205 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

It is further contemplated that although the various embodiments are discussed with respect to applications 101, the embodiments are also applicable to any IT service, resource (e.g., hardware or software), and/or the like that is deployed within the computing infrastructure of a company or organization, and for which management data is available. The computing infrastructure, for instance, refers to the totality or subset of the IT assets (e.g., software, hardware, networks, systems, tools, etc.) used or operated by the company including both physical and virtual assets.

In step 301, the feature extraction module 201 determines application management data related to one or more applications of the IT portfolio being evaluated. In one embodiment, the application management data includes characteristics indicating a lifecycle of an application (e.g., an application 101) within a computing infrastructure. As noted above, the lifecycle of an application may include phases such as but not limited to being under construction (i.e., Pre-Launch), in production (i.e., Live), in the process of being shut down in response to a business request (i.e., Ramp Down), and completely shut down or decommissioned (i.e., Decommissioned). For example, the application management data may include data or features indicating an owner, a product manager, technical personnel, or a combination thereof associated with an application 101 within an organization. Generally, the application (or service) being evaluated is typically one of thousands of applications within a large portfolio of applications (or services) of an organization.

In one embodiment, the application management platform 107 can evaluate just those applications in the portfolio that have not been flagged or labeled as being decommissioned, in ramp down, abandoned, or other equivalent status to indicate that the application 101 is no longer supported, used, or operated by the organization. To find such applications 101, the feature extraction module 201 queries the application management database 107 of a company to determine applications 101 that are in lifecycle stages that do not correspond to abandonment such as when applications are flagged in the Pre-Launch or Live stages. In other words, the feature extraction module 201 can determine whether an application 101 has been manually or otherwise previously labeled as Pre-Launch/Live (non-abandoned) or Ramp Down/Decommissioned (abandoned). The assumption is that applications that are not abandoned (i.e., Pre-Launch or Live) will have more data indicative of active ownership and/or maintenance. In one example use case, of 1586 applications in a portfolio of applications, 22% of the applications were determined to be in Pre-Launch, 42% Live, 2% Ramp Down, and 34% Decommissioned.

In some cases, an organization or company may have between 1000-2000 applications (e.g., 1500 applications) in different various lifecycle states. In a large portfolio of services, it can be easy to lose focus especially if there are a large number of new projects to bring new applications and services to production. As a result, many applications may not be properly flagged in the CMDB 111 or equivalent. Under this scenario, instead of just evaluating applications not flagged as abandoned, the application management platform 107 can evaluate all applications recorded in the CMDB 111 regardless of their lifecycle flags.

In one embodiment, the feature extraction module 201 can determine or retrieve relevant data from any of the data sources (e.g., CMDB 111, application resources database 113, etc.) comprising the application management data 109. As used herein, relevant data refers to the application management data item or field that has an effect or correlation with an abandonment status (e.g., abandoned or not abandoned) of an application (e.g., an effect or correlation above a predetermined threshold). For example, the relevant application management data 109 can include but is not limited to:

Application Data History: the CMDB 111 keeps an audit trail of changes made in the application data for each application. In one embodiment, each change has an action, change details, a timestamp, and who made the change.

Application Support Tickets: the CDMB 111 alone or in combination with an issue/support tracking system (e.g., a JIRA system or equivalent) can track issue or support calls from end users of each application who are having trouble or issues with the application. In one embodiment, each issue has a key, summary, creation timestamp, and priority.

Contact Persons and Roles: the CMDB 111 keeps track of persons, project teams, business units, etc. and what role they are playing for each application. In one embodiment, the CMDB 111 queries contact data for these persons, teams, units, etc. from company directories. If a person, team, unit, etc. leaves or is no longer active in the company, there is an "aged out" field that is flagged upon departure.

Allocated Computing Resources: the CMDB 111 and/or the application resources database 113 keep track of computing resources (e.g., AWS cloud reserves, in-house server resources, etc.) assigned to an application. Through these data sources, the feature extraction module 201 can get information such as the machine images (e.g., AWS machine image), names, creation dates, etc. This data can provide some indication whether the system supporting the application is being updated or if the system is running an old, outdated Operating System image.

Resource Usage: the application resources database 113 keeps data on the utilization rates of the computing resources (e.g., AWS resources) by each application. In one embodiment, the utilization rates can be based on data on CPU utilization, bandwidth traffic, memory utilization, etc. over a period of time. Applications 101 with utilization rates below a threshold value can be flagged as "highly underutilized resources", which can be used as a feature for determining whether an application is abandoned.

The example application management data items above are provided by way of illustration and not as limitations. In one embodiment, the feature extraction module 201 scans through the data sources of the application management data 109 (e.g., CMDB 111, application resources database 113, etc.) at a specified deployment interval to ensure that the determined application management data is up-to-date.

In step 303, the feature extraction module 201 extracts one or more features (i.e., properties or characteristics) from the application management data 109. In one embodiment, extracting comprises processing the application management data as determined above to convert the data into a format suitable for input into the trained machine learning model 105. For example, the features or data items can be converted into an input vector or matrix for processing by the machine learning model 105. In addition, the feature extraction module 201 can also normalize or convert the extract data fields or features into a common taxonomy or dictionary of terms. For example, labels indicating that an application is in a "Pre-Launch" stage can potentially be labeled as "Pre-Development", "Pre-Planning", or similar. In one embodiment, the feature extraction module 201 can normalize these synonymous terms to a selected standardized label (e.g., "Pre-Launch"). Other examples of feature conversion can include but are not limited to: converting a text label to a Boolean flag (e.g. "Pre-Launch" label converted to a value of 1 for a prelaunch Boolean flag); converting text labels to categorical labels, converting dates/times to a standardized format, etc.

In some embodiments, the machine learning model 105 may have been trained using features that include engineered or derived features. Engineered features, for instance, are features that are calculated from the determined application management data or other features extracted from the data. In other words, the feature extraction module 201 can use the application management data values retrieved as described above, and then perform a calculation or transformation to derive a corresponding engineered feature. Examples of engineered features include but are not limited to:

Count of last modifications over last 365 days: This feature shows the overall change management activity over last year.

Age of last modification in days: This feature shows how many days ago the last change management activity was done.

Count of aged out assigned persons/roles: This feature shows the number of people/teams/business units/etc. that have been assigned to the application but have been aged out (e.g., due to leaving the company).

Minimum age of machine image: This feature shows the minimum age of the machine image (e.g., Amazon Machine Image (AMI)) used to instantiate the application on an assigned compute node (e.g., an EC2 node).

Age of last issue/support ticket: This feature calculates the age of the last issue/support ticked (e.g., based on ticket creation data) that is associated with the application.

In each of the above examples, the values of these engineered features are not directly queried or determined from the application management data sources but are instead calculated or processed from those sources. Accordingly, depending on the features on which the machine learning model 105 was trained or expects as inputs, the feature extraction module 201 can be provided with the calculations, rules, processes, and/or the like for calculating the engineered features. As other examples, the one or more engineered features may include other derived features such as a change in the owner of the application, the product manager, the technical personnel, or a combination. In one instance, the change may be based on the owner, manager, or technical personnel leaving the organization or being reassigned to another application and/or project within the organization (e.g., as part of a team shifting around within the organization).

In step 305, after feature extraction, feature engineering, and/or feature conversion/transformation as described above to generate a set of input features, the application management platform 107 can process the set of input features using a trained machine learning model 105 to predict or classify the abandonment status of an application 101 being evaluated (e.g., whether the application 101 is in an abandoned state or non-abandoned state). By way of example, the machine learning model 105 can be trained to classify or predict the abandonment status of the application 101 according to the process described below with respect to FIG. 4. The training of the machine learning model 105, for instance, enables the machine learning model 105 to use a predetermined set of weights, correlations, relationships, etc. among the input features to output the abandonment status. In one embodiment, the output can be either "abandoned" or "non-abandoned". In addition or alternatively, the output can include a calculated probability (e.g., 0 to 1 with 0 being no probability and 1 being highest probability, or equivalent) of being "abandoned" or "non-abandoned". In yet another embodiment, the output can be a probability of any of the lifecycle stages (e.g., pre-launch, live, ramp down, or decommissioned). The application management platform 107 can then translate the predicted lifecycle to an abandonment status. For example, if the output of the machine learning model 105 is "pre-launch" or "live", the application management platform 107 can designate the abandonment status of the application as "non-abandoned". Conversely, if the output of the machine learning model 105 is "ramp down" or "decommissioned", the application management platform 107 can designate the abandonment status of the application 101 as "abandoned". In other words, the machine learning model 105 classifies the application in a decommissioned state or a ramp down state to represent the lifecycle state of the application 101 as a proxy for the classifying of the application 101 in the abandoned state.

In one embodiment, after classifying the abandonment status of an application 101 being evaluated, the decommissioning module 205 can optionally make recommendations or initiate actions related to the application 101 based on the determined abandonment status. For example, if an application 101 is classified as abandoned, the decommissioning module 205 can send a notification to system administrators or other users to start the review process to find a responsible party to take ownership for the maintenance of the application 101. In one embodiment, the decommissioning module 205 can initiate a decommissioning of the application 101 within the computing infrastructure based on classifying the application 101 in the abandoned state. Conversely, the decommissioning module 205 can initiate a continued maintenance of the application 101 in the computing infrastructure based on classifying the application 101 in the non-abandoned state. In this way, the application management platform 107 can fully automate the process for finding and resolving abandoned applications 101. This fully automatic process advantageously enables continuous application portfolio transformation and unlocks significant amounts of cost savings potential (e.g., millions of dollars). The process also helps to mitigate security risks by identifying applications 101 that have not been properly maintained. Therefore, the embodiments described herein also have applications for IT security management.

An example Classification Report using the trained machine learning model 105 is depicted in Table A; however, it should be noted that the example data depicted in Table A is provided for illustration and is not intended as a limitation.

TABLE A

|  | precision | recall | f1-score | support |
|---|---|---|---|---|
| 0.0 | 0.97 | 0.81 | 0.88 | 541 |
| 1.0 | 0.91 | 0.99 | 0.95 | 1041 |
| avg/total | 0.93 | 0.93 | 0.92 | 1582 |

In one embodiment, the application management platform 107 is most interested in applications that are "Not Decommissioned" as recorded in the company's application management system (e.g., CMDB 111), but where the machine learning model 105 predicts that they are in fact "Decommissioned". Table B below illustrates an example confusion matrix which compares the documented application status (e.g., status as recorded in the CMDB 111) versus the predicted application status (e.g., the output of the trained machine learning model 105 using application management data stored in the CMDB 11 and other data sources). In the example confusion matrix below, there are 14 applications (highlighted in bold) that are predicted as decommissioned but are documented as not decommissioned. Specifically, these applications 101 exhibit similar data patterns as "Decommissioned" applications in terms of abandonment, such as No more CMDB updates in last year (Contacts, History, JIRA tickets, etc.)

Aged out Contacts, age of last tickets or CMDB events longer than with active applications

TABLE B

|  | Predicted: Decommissioned | Predicted: Not Decommissioned |
|---|---|---|
| Documented: Decommissioned | 438 | 103 |
| Documented: Not Decommissioned | 14 | 1027 |

Therefore, these 14 applications may be using unnecessary company resources or pose security risks because they may be misclassified in the current CMDB 111. It should be noted that the example data depicted in Table B is provided for illustration and is not intended as a limitation. In one embodiment, the decommissioning module 205 can present to operators or to the management one or more applications that could benefit from more attention and/or resource allocation based on their classified abandonment status (i.e., a prompt to "unabandon" an application).

Figure 4:
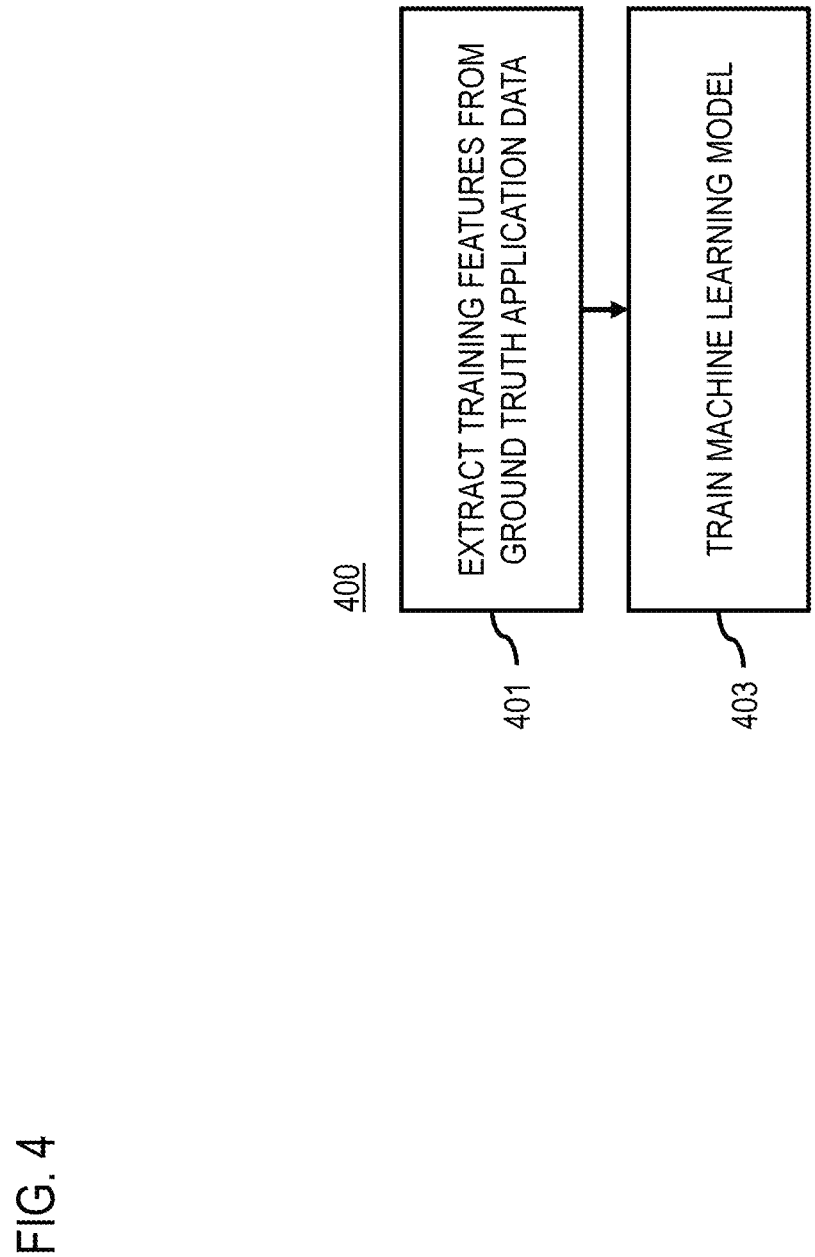
FIG. 4 is a flowchart of a process for training a machine learning model to classify or predict the abandonment status of an application, according to one embodiment.

FIG. 4 is a flowchart of a process for training a machine learning model to classify the abandonment status of an application, according to one embodiment. In various embodiments, the application management platform 107, machine learning model 105, and/or any of the modules 201-205 may perform one or more portions of the process 400 and may be implemented in, for instance, a chip set including a processor and a memory as shown in FIG. 7. As such, the application management platform 107, machine learning model 105, and/or any of the modules 201-205 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in connection with process 300 in any order or combination and need not include all of the illustrated steps. That is, in one embodiment, the process 400 can be used to train the machine learning model 105 for classifying the abandonment status of applications 101 according to the embodiments of the process 300 described above.

In one embodiment, the process 400 is based on generating or obtaining a set of ground truth data about known applications (e.g., ground truth applications) including the features most relevant to classifying whether an application 101 is abandoned. The ground truth data can include application management data 109 such as those described above with respect to the process 300 of FIG. 3, except that the application management data 109 has been labeled or annotated with ground truth labels indicating whether that the application 101 is abandoned or not. For example, the ground truth labels may be "abandoned" versus "non-abandoned". In addition or alternatively, the ground truth labels can be a corresponding lifecycle stage of the application (e.g., pre-launch, live, ramp down, or decommissioned).

In one embodiment, example features of the application management data 109 that can be used for training include but are not limited to data fields such as history, tracking software tickets (e.g., JIRA tickets), contact persons and roles, and cloud computing resources (e.g., Amazon Web Services (AWS)). In terms of an application history, in one instance, the application management platform 107 may identify an audit trail of changes done for application data. Specifically, each change may include an action, change details, a timestamp, and which personnel performed such actions. With respect to tracking software tickets, the application management platform 107, in one instance, may query an issue tracking system (e.g., a JIRA system) for tickets related to an application 101. Each queried issue may have a key, a summary, a creation timestamp, a priority, and/or the like. In one embodiment, the application management platform 107 may keep track of persons and what role they are playing for each application 101. Further, the application management platform 107 may pull contact information from a company's active directory and if the system 100 determines that the person has left the company, the system 100 can flag an "aged out" field upon the person's departure. Further, in one instance, the application management platform 107 can keep track of computing resources (e.g., AWS resources) assigned to an application. The application management platform 107 can use, for instance, application programming interfaces (APIs) to get information such as the organization or company AMI (AWS machine image) name and creation date. In one instance, the name and creation date can provide some indication as to whether the system 100 is being updated or if the system 100 is running an old, outdated Operating System image. As discussed above, other features can include but are not limited to detailed information from AWS on resources and services. For example, the application management platform 107 can then run a report on "highly underutilized resources" that collects Amazon Elastic Compute Cloud (Amazon EC2) instances with very low central processing unit (CPU) utilization and low network traffic over a period.

In certain instances; however, the extracted data may not be suitable for machine learning purposes, therefore some feature engineering may be required to come up with more meaningful features in terms of determining the abandonment state of an application. For example, with respect to the History data, the application management platform 107 can create two features from the audit trail data, namely: (1) a count of last modifications over last 365 days, which shows the overall change activity over the last year; and (2) age of last modification in days, which shows how many days ago the last change management activity was done. For the Contacts data, the application management platform 107 can create a feature that counts how many persons/roles assigned to this application have been aged out (e.g., due to leaving the company). With respect to AWS Resources data, the application management platform 107 can create a feature that calculates the age of the minimum age of the AMI used to instantiate the EC2 compute node. Further, for the JIRA data, the application management platform 107 can create a feature that calculates the age of the last JIRA ticket (based on creation date) that is associated with the application 101.

As illustrated above, the ground truth application management may include any number of features or characteristics of applications in an IT portfolio (e.g., such as those listed above). However, some of the features may not correlate well or at all with the abandonment status of an application 101. Including such features in ground truth training data, therefore, would not increase or contribute to the predictive power of the machine learning model 105. Accordingly, in step 401, the feature extraction module 201 processes the ground truth application management data to extract training feature(s). In one embodiment, the application management platform 107 can use Principal Component Analysis (PCA) and Univariate Selection as a statistical method to select the best correlated features to predict or classify the abandonment status or a lifecycle of an application 101. In other words, the application management platform 107 extracts the training features from the ground truth application management data by first determining a set of candidate features. The application management platform 107 then selects the training features from among the set of candidate features based on a calculated correlation of the candidate features with respect to classifying an abandonment status (e.g., abandoned, non-abandoned, or other correlated application lifecycle stage). As discussed above, the correlation can be determined based on PCA and Univariate Selection, or other equivalent processes.

In step 403, the training module 203 trains a machine learning model 105 using the one or more training features, the ground truth application data, or a combination thereof. In one embodiment, the application management platform 107 uses a support vector machine (SVM) with a linear kernel to fit the machine learning model 105 to the ground truth data. The application management platform 107 can perform hyperparameter optimization for the machine learning model 105 with a grid search or equivalent in order to increase prediction accuracy of the target variable. For example, the target variable can be 0, if the application 101 is abandoned or decommissioned, and 1 if the application 101 is another classification (e.g., non-abandoned, pre-launch, live, etc.). It is contemplated, however, that any type of machine learning model (e.g., neural network, decision tree, Random Forest, etc.) can be used in the various embodiments described herein. In this instance, the machine learning module 105 is trained to classify an abandonment status of an application 101 (e.g., abandoned or not abandoned). In another instance, the machine learning model 105 can be trained to predict whether an application should be decommissioned or not (e.g., if no one in the organization is paying attention to the application).

In one embodiment, the application management platform 107 can train the machine learning model 105 by creating a feature vector or matrix comprising the selected training features. During the training process, a learner module of the application management platform 107 feeds the feature vectors or matrices of the training data set (e.g., the ground truth data) into the machine learning model 105 to compute a predicted abandonment status or application lifecycle with an initial set of model parameters. The learner module then compares the predicted abandonment status/lifecycle to the ground truth labels of the ground truth training data set. In addition, the learner module computes an accuracy of the predictions or classifications for the initial set of model parameters. If the accuracy or level of performance does not meet a threshold or configured level, the learner module incrementally adjusts the model parameters until the machine learning model 105 generates predictions at the desired level of accuracy with respect to the abandonment status. In other words, the "trained" machine learning model 105 is a model whose parameters are adjusted to make accurate predictions with respect to the ground truth data.

Figure 5A:
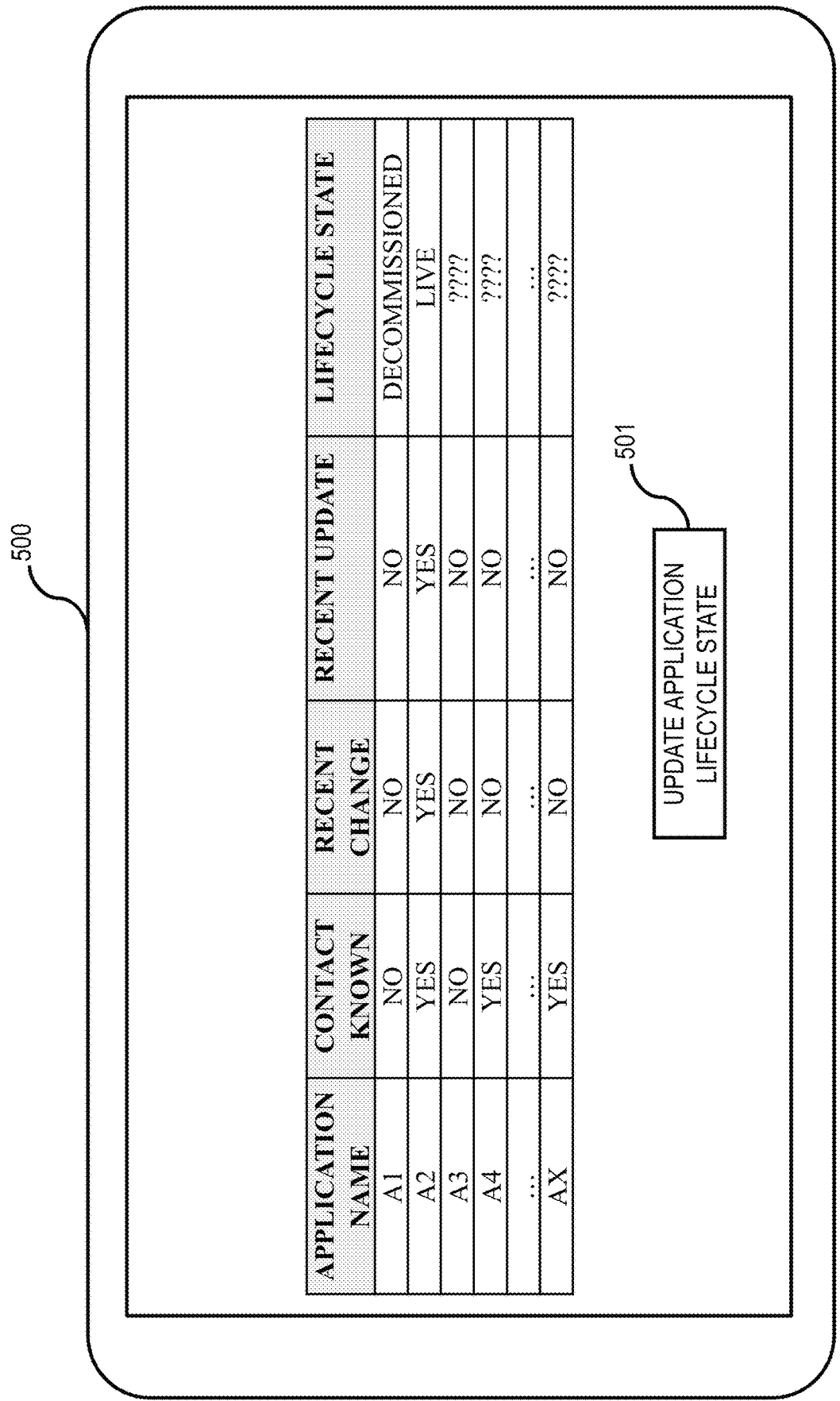
FIGS. 5A and 5B are diagrams illustrating an example user interface for identifying abandoned applications and services, according to one embodiment.
Figure 5B:
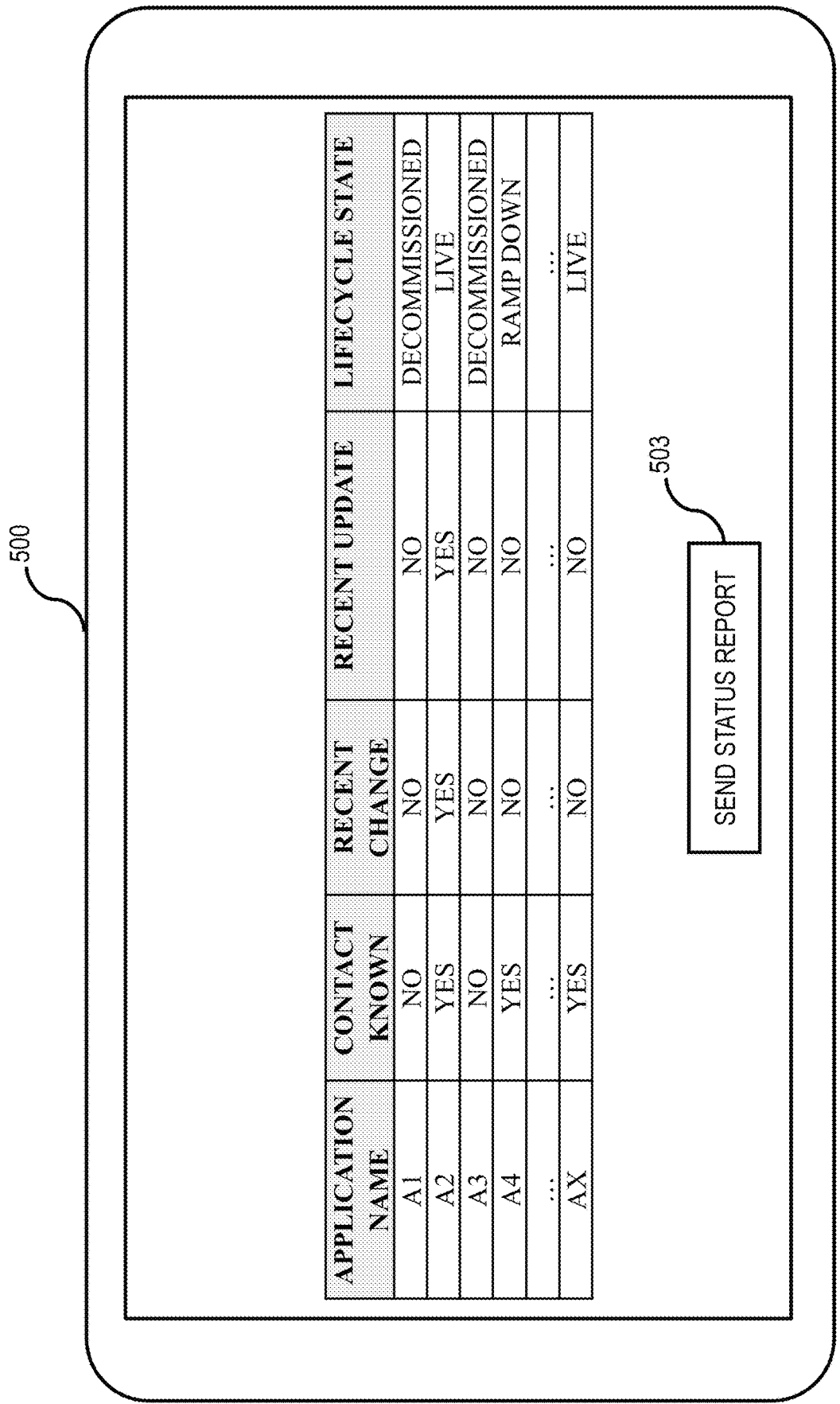

FIGS. 5A and 5B are diagrams of example user interfaces for identifying an abandonment status of an application, according to one embodiment. In this example, a user interface (UI) 500 is generated for a client terminal 117 (e.g., a mobile handset) that enables a user (e.g., an IT technician) to view the applications 101 (or services) (e.g., applications A1-AX) that are part of a large portfolio of an organization (e.g., IT portfolio 103). As shown, the UI 500 presents the applications A1-AX in a tabular form including representative application management data (e.g., contact persons, history, and resources) and lifecycle state (if known).

As shown, the abandonment status of applications A3, A4, and AX are each unknown. As described above, operating applications that have been "abandoned" by respective product teams or business units can be very costly to an organization. In one embodiment, it is contemplated that the system 100 can automatically initiate a classification of the applications A1-AX (e.g., using an automated machine learning-based adaptive method) on a weekly, monthly, quarterly, annual basis without any input. In another embodiment, the UI 500 can include an input 501 to enable an IT technician, for example, to request an update of the abandonment status of the applications in the portfolio on an as-needed basis (e.g., before a budget cycle review).

In one embodiment, the system 100 determines application management data 109 related to the applications A1-AX. As shown in FIG. 5A, the system 100 can access CMDB data fields associated with the applications A1-AX including contact persons ("Contact Known"), history ("Recent Change"), and resources ("Recent Update") to gain insight on the abandonment status of each application. In this example, the system 100 already knows that application A1 is shut down or "Decommissioned" and that application A2 is in production or use or "Live."

As discussed above, in one embodiment, the system 100 can use a trained machine learning model (e.g., the machine learning model 105) to classify the abandonment status of each application 101 or the system 100 can train a model using one or more training features. In this instance, the system 100 trains the model by first processing ground truth application management data (e.g., manually labeled data) related to a ground truth application to extract one or more training features. Applications A1 and A2 are considered and/or used by the system 100 as ground truth applications in this example, particularly since their lifecycle state and/or abandonment status is already known. As shown, the training features for a "Decommissioned" application (A1) include no known contact, no recent changes, and no recent updates. In contrast, the training features for a "Live" application (A2) include a known contact, recent changes, and recent updates. It should be understood that the model would also be trained using more nuanced ground truth application management data wherein the resultant lifecycle state may not be so readily deducible.

In one embodiment, to classify the abandonment status of the applications A3, A4, and AX, the system 100 extracts one or more features from the application management data 109 related to the applications 101. For example, A3 shows no known contact, no recent changes, and no recent changes; A4 shows that the contact is known, but no recent changes or recent updates; and AX shows that the contact is known, but no recent changes or recent updates have occurred.

In one embodiment, having trained the machine learning model 105, the system 100 can process the one or more features to classify the abandonment status of the applications A3, A4, and AX, as shown in FIG. 5B. As described above, in one embodiment, the model is trained to predict whether an application 101 should be decommissioned or not. By definition "Decommissioned" applications have been "abandoned" since nobody is paying attention to them any long. Therefore, the system 100 is looking for active applications that look very similar to "Decommissioned" ones. In other words, the applications 101 exhibit similar data patterns to the decommissioned applications 101 in terms of abandonment (e.g., no more CMDB updates in the last year, aged out contacts, etc.). In this instance, the system 100 can classify or predict with a high degree of certainty that the application A3 is also "Decommissioned" since there is no contact data, no recent changes have been made to the application, and there have been no recent updates. In the example of application A4, the system 100 can predict that while the contact may be known, there have been no recent changes and no recent updates (e.g., the application

101 may no longer be useful or productive, a contract may have ended, resources may have been removed, etc.) and, therefore, it is likely that the application 101 will go through the Ramp Down state soon (i.e., be abandoned). In one embodiment, the UI 500 can include an input 503 to enable an IT technician, for example, to send a notification or status report to operators, for example, to start a service off-boarding to decommission the application A4. In one embodiment, the system 100 can automatically send the notification to the operators, for example. In the example of application AX, the system 100 can predict that although there has been no recent changes or recent updates, the contact is known and therefore the application 101 is still "Live." In this instance, the system 100 can automatically send a notification to an operator, for example, to start the review process to find a responsible party to take ownership of the software maintenance. With respect to application AX, it is important to note that there is often little correlation between technical aspects of an application (e.g., low usage) and whether an organization has abandoned an application and that human activity with respect to an application is often more indicative of the true abandonment status of the application.

Returning to FIG. 1, in one embodiment, the application management platform 107 has connectivity over the communication network 115 to the services platform 119 (e.g., an OEM platform) that provides one or more services 121. By way of example, the services 121 may also be other third-party services and include application deployment and/or installation services, application maintenance services (e.g., automatic or periodic software updates), application accounting or cost services, organizational services, calendar services, notification services, social networking services, content (e.g., audio, video, images, etc.) storage services, contextual information determination services, location-based services, information-based services (e.g., weather, news, etc.), etc.

In one embodiment, content providers 123a-123k (also collectively referred to herein as content providers 123) may provide content or data (e.g., application name, creation date, ownership information, etc.) to the machine learning model 105, the application management platform 107, the services platform 119, and the services 121. The content provided may be any type of content, such as written content, contextual content, audio content, video content, image content, etc. In one embodiment, the content providers 123 may also store content associated with the applications 101 or the IT portfolio 103.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the application management platform 107 may include multiple interconnected components. For example, these components may include multiple servers, intelligent networking devices, computing devices, algorithms, components and corresponding software for identifying abandoned applications and services as described with respect to the various embodiments. Although depicted as separate components, it is contemplated one or more functions of the application management platform 107 may be combined into a single component or any component of the system 100. Example components of the application management platform 107 are illustrated in FIG. 2 and further discussed below.

By way of example, the client terminal 117 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client terminal 117 can support any type of interface to the user (such as "wearable" circuitry, etc.).

By way of example, the IT portfolio 103, the application management platform 107, the client terminal 117, the services platform 119, the services 121, and the content providers 123 may communicate over the communication network 115 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The processes described herein for identifying abandoned applications and services may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
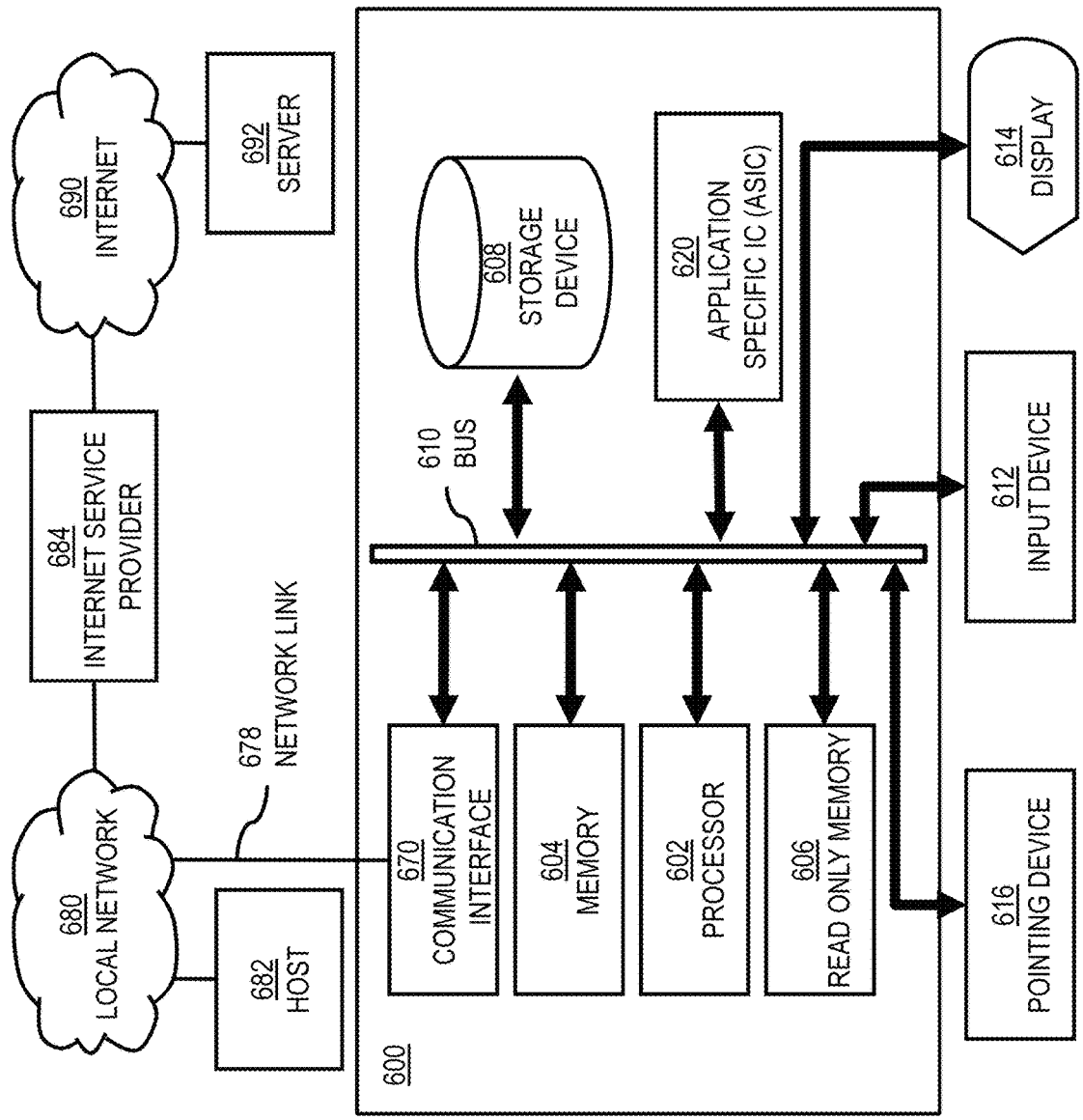
FIG. 6 is a diagram of hardware that can be used to implement an embodiment.

FIG. 6 illustrates a computer system 600 upon which an embodiment of the invention may be implemented. Computer system 600 is programmed (e.g., via computer program code or instructions) to identify abandoned applications and services as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to identifying abandoned applications and services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random-access memory (RAM) or other dynamic storage device, stores information including processor instructions for identifying abandoned applications and services. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for identifying abandoned applications and services, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 115 for identifying abandoned applications and services.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 7 illustrates a chip set 700 upon which an embodiment of the invention may be implemented. Chip set 700 is programmed to identify abandoned applications and services as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to identify abandoned applications and services. The memory 705 also stores the data associated with or generated by the execution of the inventive steps.

FIG. 8 is a diagram of exemplary components of a mobile station 801 (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to identify abandoned applications and services. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for identifying an abandonment status of an application, comprising:
    determining application management data related to the application, wherein the application management data includes characteristics indicating a lifecycle of the application within a computing infrastructure, the abandonment status includes an abandoned state and a non-abandoned state, and the abandoned state is a state that the application is no longer supported by an organization;
    extracting one or more features from the application management data based on a correlation of the one or more features to the abandonment status that is calculated using a trained machine learning model;
    classifying the abandonment status of the application based on the one or more features; and
    causing a continued support of the application in the computing infrastructure based on classifying the application in the non-abandoned state,
    wherein the continued support includes continual updates, improvements, or a combination thereof of the application.

2. The method of claim 1, further comprising:
    initiating a decommissioning of the application within the computing infrastructure based on classifying the application in the abandoned state.

3. The method of claim 2, wherein the machine learning model classifies the application in a decommissioned state to represent the lifecycle state of the application as a proxy for the classifying of the application in the abandoned state.

4. The method of claim 1,
    wherein the continued support includes continual fixes of the application.

5. The method of claim 1, wherein the application management data includes data indicating an owner, a product manager, technical personnel, or a combination thereof associated with the application within the organization.

6. The method of claim 5, wherein the one or more features include a change in at least one of the owner, the product manager, the technical personnel, or a combination thereof that causes the application being not supported.

7. The method of claim 6, wherein the change includes determining that the at least one owner, the product manager, the technical personnel, or a combination thereof has left the organization or has been reassigned within the organization that causes the application being not supported.

8. The method of claim 1, further comprising:
processing the application management data to determine a count of modifications to the application over a predetermined time period, an age of a last modification of the application, or a combination thereof,
wherein the one or more features include the count of modifications, the age of the last modification, or a combination thereof.

9. The method of claim 1, further comprising:
processing the application management data to determine resource data related to one or more resources assigned to the application,
wherein the resource data includes an identification, an age, a change, or a combination thereof of the one or more resources.

10. The method of claim 1, further comprising:
performing one or more recommendations based on the classified abandonment status of the application, wherein the one or more recommendations include starting a review process to find a responsible party of the application or causing the continued support of the application.

11. The method of claim 1, further comprising:
querying a configuration management database to determine a plurality of applications that are not flagged as decommissioned in the computing infrastructure,
wherein the application is selected from among the plurality of applications.

12. An apparatus for identifying an abandonment status of an application, comprising:
at least one processor; and
at least one memory including computer program code for one or more programs,
the at least one memory and the computer program code configured to, with the at least one processor, cause the apparatus to perform at least the following,
determine application management data related to the application, wherein the application management data includes characteristics indicating a lifecycle of the application within a computing infrastructure, the abandonment status includes an abandoned state and a non-abandoned state, and the abandoned state is a state that the application is no longer supported by an organization;
extract one or more features from the application management data based on a correlation of the one or more features to the abandonment status that is calculated;
classify the abandonment status of the application based on the one or more features; and
cause a continued support of the application in the computing infrastructure based on classifying the application in the non-abandoned state,
wherein the continued support includes continual updates, improvements, or a combination thereof of the application.

13. The apparatus of claim 12, wherein the apparatus is further caused to:
initiate a decommissioning of the application within the computing infrastructure based on the classifying of the application in the abandoned state.

14. The apparatus of claim 12, wherein application management data includes data indicating an owner, a product manager, technical personnel, or a combination thereof associated with the application within the organization.

15. The apparatus of claim 14, wherein the one or more features include a change in at least one of the owner, the product manager, the technical personnel, or a combination thereof that causes the application being not supported.

16. The apparatus of claim 12, wherein the apparatus is further caused to:
process the application management data to determine a count of modifications to the application over a predetermined time period, an age of a last modification of the application, or a combination thereof,
wherein the one or more features include the count of modifications, the age of the last modification, or a combination thereof.

17. A non-transitory computer-readable non-transitory storage medium for identifying an abandonment status of an application, carrying one or more sequences of one or more instructions which, when executed by one or more processors, cause an apparatus to perform:
determining application management data related to the application, wherein the application management data includes characteristics indicating a lifecycle of the application within a computing infrastructure, the abandonment status includes an abandoned state and a non-abandoned state, and the abandoned state is a state that the application is no longer supported by an organization;
extracting one or more features from the application management data based on a correlation of the one or more features to the abandonment status that is calculated using a trained machine learning model;
classifying the abandonment status of the application based on the one or more features; and
causing a continued support of the application in the computing infrastructure based on classifying the application in the non-abandoned state,
wherein the continued support includes continual updates, improvements, or a combination thereof of the application.

18. The non-transitory computer-readable storage medium of claim 17, wherein the apparatus is further caused to perform:
initiating a decommissioning of the application within the computing infrastructure based on classifying the application in the abandoned state,
wherein the machine learning model classifies the application in a decommissioned state to represent the lifecycle state of the application as a proxy for the classifying of the application in the abandoned state.

19. The non-transitory computer-readable storage medium of claim 17, wherein the application management data includes data indicating an owner, a product manager, technical personnel, or a combination thereof associated with the application within the organization, and wherein the one or more features include a change in at least one of the owner, the product manager, the technical personnel, or a combination thereof that causes the application being not supported.

20. The apparatus of claim 12, wherein the apparatus is further caused to:

process the application management data to determine resource data related to one or more resources assigned to the application, wherein the resource data includes an identification, an age, a change, or a combination thereof of the one or more resources.

\* \* \* \* \*